US010992736B2

(12) United States Patent
Zhang

(10) Patent No.: US 10,992,736 B2
(45) Date of Patent: *Apr. 27, 2021

(54) INFORMATION PROCESSING METHOD, APPARATUS, TERMINAL, AND SERVER

(71) Applicant: Tencent Technology (Shenzhen) Company Limited, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 75 days.

This patent is subject to a terminal disclaimer.

(21) Appl. No.: 16/543,359

(22) Filed: Aug. 16, 2019

(65) Prior Publication Data

US 2019/0373048 A1 Dec. 5, 2019

Related U.S. Application Data

(63) Continuation of application No. 13/939,127, filed on Jul. 10, 2013, now Pat. No. 10,432,698.

(30) Foreign Application Priority Data

Sep. 27, 2012 (CN) .......................... 201210369751.1

(51) Int. Cl.
 *H04L 29/08* (2006.01)
 *G06F 16/955* (2019.01)
(52) U.S. Cl.
 CPC .......... *H04L 67/10* (2013.01); *G06F 16/9562* (2019.01); *H04L 67/02* (2013.01)
(58) Field of Classification Search
 CPC ............................................. G06F 17/30884

(Continued)

(56) References Cited

U.S. PATENT DOCUMENTS

| 6,393,462 B1 | 5/2002 | Mullen-Schultz |
| 7,263,526 B1 | 8/2007 | Busey et al. |

(Continued)

FOREIGN PATENT DOCUMENTS

| CN | 1867142 A | 11/2006 |
| CN | 101471953 A | 7/2009 |

(Continued)

OTHER PUBLICATIONS

Tencent Technology, ISRWO, PCT/CN2013/079103, Oct. 17, 2013, 9 pgs.

(Continued)

*Primary Examiner* — Suraj M Joshi
*Assistant Examiner* — Melaku Y Habtemariam
(74) *Attorney, Agent, or Firm* — Morgan, Lewis & Bockius LLP

(57) ABSTRACT

The present invention discloses an information processing method, apparatus, terminal, and server. The method includes: detecting a predefined user operation on a web bookmark application installed in a web browser at a first terminal; in response to the user operation, obtaining address and link information of a current webpage in the web browser and sending the address and link information to a remote server; receiving an information transmission notification message from the remote server after the remote server forwards the address and link information and a plurality of thumbnail images associated with the webpage to a second mobile terminal; in response to the information transmission notification message, generating an information sharing prompt message identifying a total number of webpages the first terminal has shared with the second mobile terminal; and sending the information sharing prompt message to the second mobile terminal for display.

18 Claims, 22 Drawing Sheets

(58) Field of Classification Search
USPC .................. 709/201–206, 217, 227–229
See application file for complete search history.

(56) References Cited

U.S. PATENT DOCUMENTS

| | | |
|---|---|---|
| 7,526,472 B2 | 4/2009 | Heidloff et al. |
| 7,899,829 B1 | 3/2011 | Malla |
| 7,945,861 B1 | 5/2011 | Karam |
| 8,239,367 B1 | 8/2012 | Zamir et al. |
| 2002/0042886 A1 | 4/2002 | Lahti et al. |
| 2004/0172451 A1 | 9/2004 | Biggs et al. |
| 2007/0192410 A1 | 8/2007 | Liversidge et al. |
| 2007/0226295 A1 | 9/2007 | Haruna et al. |
| 2009/0131118 A1 | 5/2009 | Kim |
| 2010/0169756 A1 | 7/2010 | Bonchi et al. |
| 2010/0241711 A1 | 9/2010 | Ansari et al. |
| 2011/0295954 A1 | 12/2011 | Kowalewski |
| 2013/0155173 A1 | 6/2013 | Brady et al. |
| 2014/0068090 A1 | 3/2014 | Wang et al. |
| 2014/0089408 A1 | 3/2014 | Zhang |

FOREIGN PATENT DOCUMENTS

| | | |
|---|---|---|
| CN | 102325271 A | 1/2012 |
| CN | 102420782 A | 4/2012 |
| CN | 102857579 A | 1/2013 |
| EP | 2387204 A1 | 11/2011 |
| JP | 2008097201 A | 4/2008 |
| KR | 20090025047 A | 3/2009 |
| WO | WO 2005109820 A1 | 11/2005 |

OTHER PUBLICATIONS

Tencent Technology, IPRP, PCT/CN2013/079103, Mar. 31, 2015, 6 pgs.

Peter Hornyack, et al., "These aren't the Droids You're Looking for; Retrofitting Android to Protect Data from Imperious Applications", In Proceedings of the 18th ACM conference on Computer and Communications Security, pp. 639-652, ACM, 2011.

Makoto Kobayashi, et al., "Collaborative Customer Services Using Synchronous Web Browser Sharing", In Proceedings of the 1998 ACM conference on Computer Supported Cooperative Work, pp. 99-109, ACM, 1998.

INFORMATION PROCESSING METHOD, APPARATUS, TERMINAL, AND SERVER

PRIORITY CLAIM AND RELATED APPLICATIONS

This application is a continuation application of U.S. patent application Ser. No. 13/939,127, entitled "INFORMATION PROCESSING METHOD, APPARATUS, TERMINAL, AND SERVER" filed on Jul. 10, 2013, which claims priority to Chinese Patent Application No. 201210369751.1, entitled "INFORMATION PROCESSING METHOD, APPARATUS, TERMINAL, AND SERVER," filed on Sep. 27, 2012, both of which are incorporated by reference in their entirety.

TECHNICAL FIELD

The disclosed implementations relate generally to the field of Internet technologies, in particular, to the field of information processing technologies, and specifically to an information processing method, apparatus, terminal, and server.

BACKGROUND

With the development of the Internet and terminal technologies, people may obtain information via the Internet, for example, browse webpage information by using a browser in a personal computer (PC), and people may also experience various applications of a terminal, for example, experience an instant messaging application, a social networking application, and so on in a mobile phone. If a user is browsing a webpage by using a browser of a PC and intends to perform processing (such as forward processing) on information of the webpage in an instant messaging application of a mobile phone, one solution may be that the user stores the information of the webpage locally, duplicates, by adopting a storage medium such as a USB disk, the information to the mobile phone, and invokes the information for processing in the instant messaging application of the mobile phone; and another solution may be that the PC end uploads the information to a cloud end server, and the mobile phone end re-logs in to the cloud end server, downloads the information from the cloud end server, and invokes the information for processing in the instant messaging application.

Under a development trend of information interconnection and interworking, in the foregoing solutions, because a storage medium needs to be involved or operations such as upload and download need to be performed, the operation complexity is increased, failing to meet an actual requirement for the convenience of information processing of a user, and how to improve the convenience of information processing has become a technical problem to be urgently solved.

SUMMARY

Embodiments of the present invention provide an information processing method, apparatus, terminal, and server, which can implement information transmission and sharing, facilitate processing on shared information, and improve the convenience of information processing.

In a first aspect, the present invention provides an information processing method, which includes:

when a trigger operation of a user on a web bookmark application of a first terminal is detected, obtaining, by the web bookmark application, link information of a current webpage in a browser where the web bookmark application is located, and sending the link information to a server;

sending, by the server, transmission prompt information to a second mobile terminal bound to the web bookmark application, and outputting, by the second mobile terminal, the transmission prompt information and sending, according to an operation of the user, an information transmission instruction to the server;

receiving, by the server, the information transmission instruction sent by the second mobile terminal, and obtaining, according to the link information, webpage information of the current webpage, and transmitting the webpage information of the current webpage to the second mobile terminal; and processing, by the second mobile terminal, the webpage information of the current webpage according to an instruction of the user.

In a second aspect, the present invention provides another information processing method, which includes:

when a trigger operation of a user on a web bookmark application of a first terminal is detected, obtaining, by the web bookmark application, link information of a current webpage in a browser where the web bookmark application is located; and sending, by the web bookmark application, the link information to a server, so that the server sends, according to the address and link information, transmission prompt information to a second mobile terminal bound to the web bookmark application, and when receiving an information transmission instruction of the second mobile terminal, transmits webpage information of the current webpage to the second mobile terminal for processing.

In a third aspect, the present invention provides still another information processing method, which includes:

receiving and outputting, by a second mobile terminal, transmission prompt information sent by a server, and sending, according to an operation of a user, an information transmission instruction to the server;

receiving, by the second mobile terminal, webpage information, which is returned by the server, of a current webpage in a browser where a web bookmark application bound to the second mobile terminal is located; and processing, by the second mobile terminal, the webpage information of the current webpage according to an instruction of the user.

In a fourth aspect, the present invention provides still another information processing method, which includes:

receiving, by a server, link information, which is sent by a web bookmark application of a first terminal, of a current webpage in a browser where the web bookmark application is located;

sending, by the server, transmission prompt information to a second mobile terminal bound to the web bookmark application; and when receiving an information transmission instruction sent by the second mobile terminal, obtaining, by the server, webpage information of the current webpage according to the address and link information, and transmitting the webpage information of the current webpage to the second mobile terminal for processing.

In a fifth aspect, the present invention provides an information processing apparatus, which includes:
an information obtaining module, configured to: when a trigger operation of a user on a web bookmark application of a first terminal is detected, obtain link information of a current webpage in a browser where the web bookmark application is located; and
an information processing module, configured to send the link information to a server, so that the server sends, according to the address and link information, transmission prompt information to a second mobile terminal bound to the web bookmark application, and when receiving an information transmission instruction of the second mobile terminal, transmits webpage information of the current webpage to the second mobile terminal for processing.

In a sixth aspect, the present invention provides a terminal, which includes a browser and further includes:
a management module, configured to load the foregoing information transmission apparatus in the browser, and manage the information transmission apparatus.

In a seventh aspect, the present invention provides another terminal, which includes:
a prompt module, configured to receive and output transmission prompt information sent by a server;
an instruction module, configured to send an information transmission instruction to the server according to an operation of a user;
an information receiving module, configured to receive webpage information, which is returned by the server, of a current webpage in a browser where a web bookmark application bound to the terminal is located; and
an information processing module, configured to process the webpage information of the current webpage according to an instruction of the user.

In an eighth aspect, the present invention provides a server, which includes:
a link receiving module, configured to receive link information, which is sent by a web bookmark application of a first terminal, of a current webpage in a browser where the web bookmark application is located;
a prompt module, configured to send transmission prompt information to a second mobile terminal bound to the web bookmark application;
an information obtaining module, configured to: when receiving an information transmission instruction sent by the second mobile terminal, obtain webpage information of the current webpage according to the address and link information; and
an information transmission module, configured to send the webpage information of the current webpage to the second mobile terminal.

In a ninth aspect, the present invention provides a computer storage medium for storing a program. When the program is run, all or part of the steps of the foregoing methods are performed.

In accordance with some implementations, an information processing method is performed at a first terminal having a processor and memory for storing one or more programs to be executed by the processor, the method comprising: detecting a predefined user operation on an application running on the first terminal to transmit a document currently displayed on the first terminal to a second mobile terminal, wherein the application is associated with the second mobile terminal through a remote server; in response to the user operation, sending an identifier of the document currently displayed on the first terminal to the remote server; receiving an information transmission notification message from the remote server after the remote server forwards the document identifier and data associated with the document to the second mobile terminal; in response to the information transmission notification message, generating an information sharing prompt message, the information sharing prompt message identifying a total number of documents the first terminal has shared with the second mobile terminal during a predefined time period; and sending the information sharing prompt message to the second mobile terminal for display to a user of the second mobile terminal.

In accordance with some implementations, an information processing method is performed at a server having a processor and memory for storing one or more programs to be executed by the processor, the method comprising: receiving an identifier of a document currently displayed on a first terminal from an application running on the first terminal, wherein the application is associated with a second mobile terminal; sending an information transmission prompt message to the second mobile terminal, wherein the information transmission prompt message is to be displayed on the second mobile terminal indicating that there is a document to be shared with the second mobile terminal by the first terminal; receiving an information transmission instruction message from the second mobile terminal, wherein the information transmission instruction message is generated by the second mobile terminal in response to a predefined user operation on the information transmission prompt message displayed on the second mobile terminal; sending the document identifier and data associated with the document to the second mobile terminal; and sending an information transmission notification message to the first terminal after sending the document identifier and data associated with the document to the second mobile terminal.

In accordance with some implementations, an information processing method is performed at a second mobile terminal having a processor and memory for storing one or more programs to be executed by the processor, the method comprising: displaying an information transmission prompt message sent from a remote server, wherein the message indicates that there is information to be shared with the second mobile terminal from a first terminal and the second mobile terminal is associated with an application running on the first terminal; in response to a predefined user operation on the information transmission prompt message displayed on the second mobile terminal, generating and sending an information transmission instruction message to the remote server; receiving and displaying an identifier of a document currently displayed on the first terminal and a plurality of thumbnail images associated with the document from the remote server, wherein the document identifier is provided to the remote server by the application running on the first terminal; and receiving and displaying an information sharing prompt message from the first terminal, the information sharing prompt message identifying a total number of documents the first terminal has shared with the second mobile terminal during a predefined time period.

In accordance with some implementations, a first terminal comprises a processor; memory; and one or more programs stored in the memory and to be executed by the processor, the one or more programs including instructions for: detecting a predefined user operation on an application running on the first terminal to transmit a document currently displayed on the first terminal to a second mobile terminal, wherein the application is associated with the second mobile terminal through a remote server; in response to the user operation, sending an identifier of the document currently displayed on the first terminal to the remote server; receiving an information transmission notification message from the remote server after the remote server forwards the document identifier and data associated with the document to the second mobile terminal; in response to the information transmission notification message, generating an information sharing prompt message, the information sharing prompt message identifying a total number of documents the first terminal has shared with the second mobile terminal during a predefined time period; and sending the information sharing prompt message to the second mobile terminal for display to a user of the second mobile terminal.

In accordance with some implementations, a server comprises a processor; memory; and one or more programs stored in the memory and to be executed by the processor, the one or more programs including instructions for: receiving an identifier of a document currently displayed on a first terminal from an application running on the first terminal, wherein the application is associated with a second mobile terminal; sending an information transmission prompt message to the second mobile terminal, wherein the information transmission prompt message is to be displayed on the second mobile terminal indicating that there is a document to be shared with the second mobile terminal by the first terminal; receiving an information transmission instruction message from the second mobile terminal, wherein the information transmission instruction message is generated by the second mobile terminal in response to a predefined user operation on the information transmission prompt message displayed on the second mobile terminal; sending the document identifier and data associated with the document to the second mobile terminal; and sending an information transmission notification message to the first terminal after sending the document identifier and data associated with the document to the second mobile terminal.

In accordance with some implementations, a second mobile terminal comprises a processor; memory; and one or more programs stored in the memory and to be executed by the processor, the one or more programs including instructions for: displaying an information transmission prompt message sent from a remote server, wherein the message indicates that there is information to be shared with the second mobile terminal from a first terminal and the second mobile terminal is associated with an application running on the first terminal; in response to a predefined user operation on the information transmission prompt message displayed on the second mobile terminal, generating and sending an information transmission instruction message to the remote server; receiving and displaying an identifier of a document currently displayed on the first terminal and a plurality of thumbnail images associated with the document from the remote server, wherein the document identifier is provided to the remote server by the application running on the first terminal; and receiving and displaying an information sharing prompt message from the first terminal, the information sharing prompt message identifying a total number of documents the first terminal has shared with the second mobile terminal during a predefined time period.

The implementation of the embodiments of the present invention has the following beneficial effects.

In the embodiments of the present invention, under the trigger operation of the user, the web bookmark application may extract the link information of the current webpage in the browser where the web bookmark application is located and send the link information to the server; and the server sends the transmission prompt information to the terminal bound to the web bookmark application, and when receiving the information transmission instruction of the terminal, transmits the webpage information of the current webpage to the terminal for processing, so as to enable the webpage information of the webpage to be transmitted in the web bookmark application and the terminal that are bound to each other, thereby implementing transmission and sharing of the webpage information, facilitating processing of the terminal bound to the web bookmark application on the shared information, and improving the convenience of information processing.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
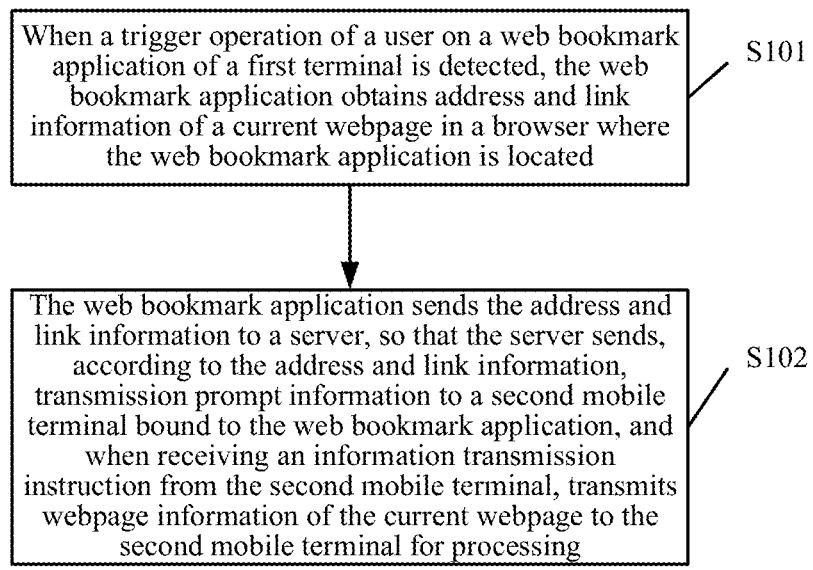
FIG. 1 is a flowchart of an information processing method provided by an embodiment of the present invention.

The following clearly and completely describes the technical solutions in the embodiments of the present invention with reference to the accompanying drawings in the embodiments of the present invention. Apparently, the described embodiments are merely a part of embodiments of the present invention rather than all of the embodiments. All other embodiments obtained by persons of ordinary skill in the art based on the embodiments of the present invention without creative efforts shall fall within the protection scope of the present invention.

In the embodiments of the present invention, a web bookmark application is a design used to store a network address in a browser, and facilitates a user to rapidly connect to a website without writing down or remembering the network address, and the network address stored in the web bookmark application may be a link address of a webpage, or a JavaScript code, or a code compiled by other languages. In the embodiments of the present invention, after a web bookmark application is loaded in a browser, link information of a current webpage in the browser is obtained, and information transmission is performed to facilitate processing of a terminal on the transmitted information. The terminal may include: devices such as a PC, a tablet computer, a mobile phone, a smart phone, an electronic reader, a notebook computer, a smart television, and a vehicular terminal. In the embodiments of the present invention, a first terminal may be a terminal of any type, and a browser is installed in the first terminal and can be used to browse a webpage in the Internet and load a web bookmark application. A second mobile terminal may be a terminal of any type, and is preferably a mobile terminal capable of detecting, through a built-in gravity sensor, an operation of a user shaking the second mobile terminal to generate a gravity sensing event; or is a mobile terminal capable of detecting voice information input by a user to form a voice control command; or is a mobile terminal disposed with a specific key, which includes a specific icon key or a specific physical key, and capable of detecting an operation of a user clicking the specific key to generate a specific key event. Unless particularly specified, in the subsequent embodiments, a browser where a web bookmark application is located refers to a browser loading the web bookmark application in the first terminal.

In the embodiments of the present invention, binding of a web bookmark application and a second mobile terminal is implemented by binding entry information of the web bookmark application and account information of the second mobile terminal. The entry information of the web bookmark application includes address information and identification information of the web bookmark application, the address information includes a uniform/universal resource locator (URL) address of the web bookmark application or a storage address of the web bookmark application; and the identification information is used to uniquely identify the web bookmark application, and the identification information may be an identity (ID) or a sequence number of the web bookmark application. The account information is preferably user account information of an application of the second mobile terminal, for example, user login account information of an instant messaging application in the second mobile terminal. A piece of account information of the second mobile terminal may be bound to at least one web bookmark application in the second mobile terminal, and a user may unbind the web bookmark application and the account information of the second mobile terminal in a setting interface of the second mobile terminal.

An information processing method provided by the embodiments of the present invention is described in detail in the following with reference to FIG. 1 to FIG. 5.

Referring to FIG. 1, FIG. 1 is a flowchart of an information processing method provided by an embodiment of the present invention. This embodiment describes an information processing method performed by a web bookmark application of a first terminal, and the method may include the following steps S101 to S102.

S101: When a trigger operation of a user on a web bookmark application of a first terminal is detected, the web bookmark application obtains address and link information of a current webpage in a browser where the web bookmark application is located.

The trigger operation of the user on the web bookmark application of the first terminal may be: an operation of the user clicking the web bookmark application, or an operation of the user selecting the web bookmark application. The link information of the current webpage includes: network address information of the current webpage and link information of images in the current webpage.

S102: The web bookmark application sends the address and link information to a server, so that the server sends, according to the address and link information, transmission prompt information to a second mobile terminal bound to the web bookmark application, and when receiving an information transmission instruction of the second mobile terminal, transmits webpage information of the current webpage to the second mobile terminal for processing.

Figure 2:
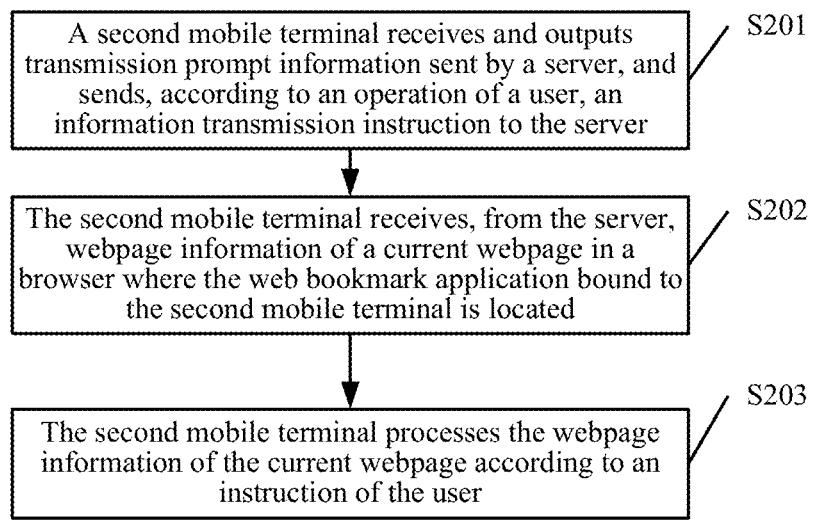
FIG. 2 is a flowchart of another information processing method provided by an embodiment of the present invention.

Referring to FIG. 2, FIG. 2 is a flowchart of another information processing method provided by an embodiment of the present invention. This embodiment describes an information processing method performed by a second mobile terminal, and the method may include the following steps S201 to S203.

S201: A second mobile terminal receives and outputs transmission prompt information sent by a server, and sends, according to an operation of a user, an information transmission instruction to the server.

In this step, the second mobile terminal outputs the transmission prompt information, which can prompt the user to perform an operation to generate the information transmission instruction. The generation of the information transmission instruction may be implemented in the following three manners.

In a first implementation manner, the second mobile terminal preferably includes a gravity sensor. The gravity sensor may be a speed sensor, an acceleration sensor, or a gyroscope sensor, and is used to detect a gravity sensing event in the second mobile terminal. When this step is performed, the second mobile terminal detects a gravity sensing event in real time, for example, a gravity sensing event generated by shaking the second mobile terminal by the user, and sends, according to the detected gravity sensing event, the information transmission instruction to the server.

In a second implementation manner, the second mobile terminal pre-stores a voice control command used to instruct information transmission, and when this step is performed, the second mobile terminal detects voice information input by the user in real time, compares the detected voice information with a preset voice control command, and if the two are matched (that is, identical or similar), sends the information transmission instruction to the server.

In a third implementation manner, a specific key is preferably set in the second mobile terminal and may include a specific icon key or a specific physical key. When this step is performed, the second mobile terminal detects a specific key event, for example, a specific key event generated by clicking a specific key by the user, and sends, according to the detected specific key event, the information transmission instruction to the server.

S202: The second mobile terminal receives webpage information, which is returned by the server, of a current webpage in a browser where the web bookmark application bound to the second mobile terminal is located.

After receiving the information transmission instruction sent by the second mobile terminal, the server obtains the webpage information of the current webpage in the browser where the web bookmark application is located from a content delivery network (CDN) and returns the webpage information to the second mobile terminal. In this step, the second mobile terminal receives the webpage information of the current webpage, and the webpage information includes: a thumbnail view of the current webpage and network address information of the current webpage.

S203: The second mobile terminal processes the thumbnail images and the address information according to a user instruction.

In this step, a process of the second mobile terminal processing the webpage information of the current webpage may include: displaying the information in a built-in browser of an application of the second mobile terminal, sharing the information with other terminal users, or sharing the information with other applications in the second mobile terminal.

Figure 3:
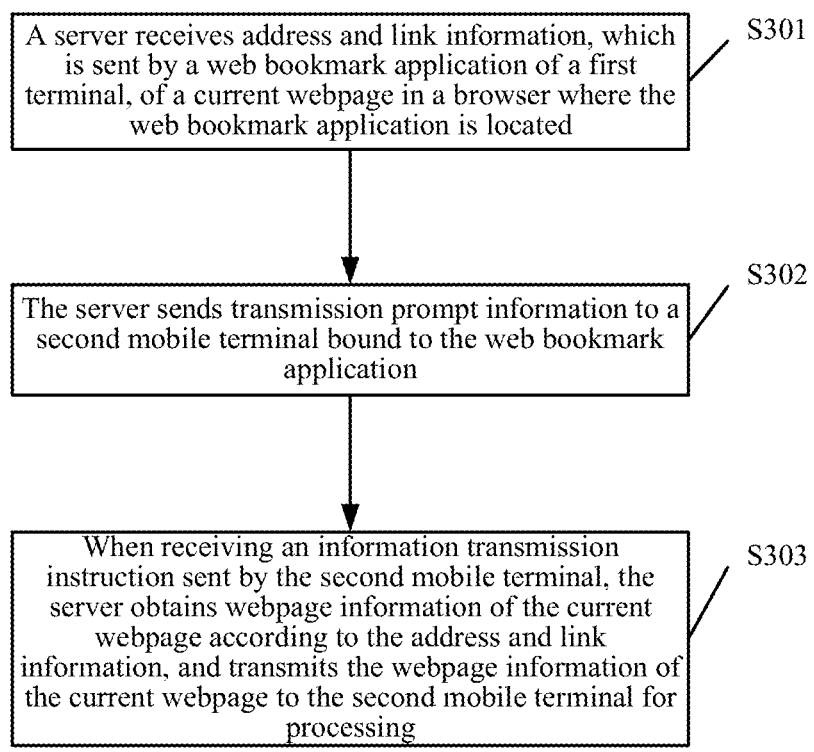
FIG. 3 is a flowchart of still another information processing method provided by an embodiment of the present invention.

Referring to FIG. 3, FIG. 3 is a flowchart of still another information processing method provided by an embodiment of the present invention. This embodiment describes an information processing method performed by a server, and the method may include the following steps S301 to S303.

S301: A server receives address and link information, which is sent by a web bookmark application of a first terminal, of a current webpage in a browser where the web bookmark application is located.

The link information of the current webpage includes: network address information of the current webpage and link information of images in the current webpage.

S302: The server sends transmission prompt information to a second mobile terminal bound to the web bookmark application.

In this step, the server sends the transmission prompt information to the second mobile terminal, which can prompt the second mobile terminal to send an information transmission instruction, so that the server transmits webpage information of the current webpage in the browser where the web bookmark application is located to the second mobile terminal, thereby implementing information sharing and interaction between the web bookmark application and the second mobile terminal.

S303: When receiving an information transmission instruction sent by the second mobile terminal, the server obtains webpage information of the current webpage according to the address and link information, and transmits the webpage information of the current webpage to the second mobile terminal for processing.

The following two feasible implementation manners exist in this step. In a first feasible implementation manner, the server may send an image obtaining request to a CDN system according to the link information, so as to request to obtain image information of which a minimum side length is larger than a preset value in the current webpage.

Because abundant image information may exist in the current webpage, for example, image information of a body part of a webpage, advertisement image information in a floating window of a webpage, or advertisement image information displayed in a boundary of a webpage. Generally speaking, a side length of advertisement image information in a webpage is small, and in this step, image information of which a minimum side length is larger than a preset value in the current webpage may be requested to be obtained, so as to filter advertisement image information in the current webpage. It should be noted that, the preset value may be set as required, for example, the preset value may be set as 100 pixels, or the preset value may be set as a value of a maximum side length in advertisement image information, or the preset value may be set as a value larger than a maximum side length in advertisement image information, and so on.

The CDN system selects, according to the image obtaining request, the image information of which the minimum side length is larger than the preset value in the current webpage, processes the image information into a thumbnail view and returns the thumbnail view to the server. The server transmits the webpage information of the current webpage to the second mobile terminal for processing.

In a second feasible implementation manner, the server may send an image obtaining request to the CDN system according to the link information, so as to request to obtain image information of a preset format in the current webpage.

The current webpage may include image information of multiple formats, for example, image information of a Joint Photographic Experts Group (JPEG) format, image information of a Bitmap (BMP) format, image information of a Graphics Interchange Format (GIF) format, image information of a Tagged Image File Format (TIF) format, and so on. A first terminal user may set a format of image information to be transmitted as required, and in this step, the server may request the image information of the current webpage according to a format set by the user, and receive a plurality of thumbnail images from the CDN system.

The CDN system selects, according to the image obtaining request, the image information of the preset format in the current webpage, processes the image information into a thumbnail view and returns the thumbnail view to the server. The server transmits the webpage information of the current webpage to the second mobile terminal for processing.

In the foregoing two feasible implementation manners, the server obtains the image information of the current page from the CDN system, and because information may exist in multiple network nodes in the CDN system, a hit rate of information obtaining can be guaranteed. In addition, the CDN system is capable of selecting, according to comprehensive information such as network traffic, and connection, load condition and response time of each node, a node closest to the server to perform an information obtaining service in real time, so as to improve an information transmission speed and stability.

Figure 4:
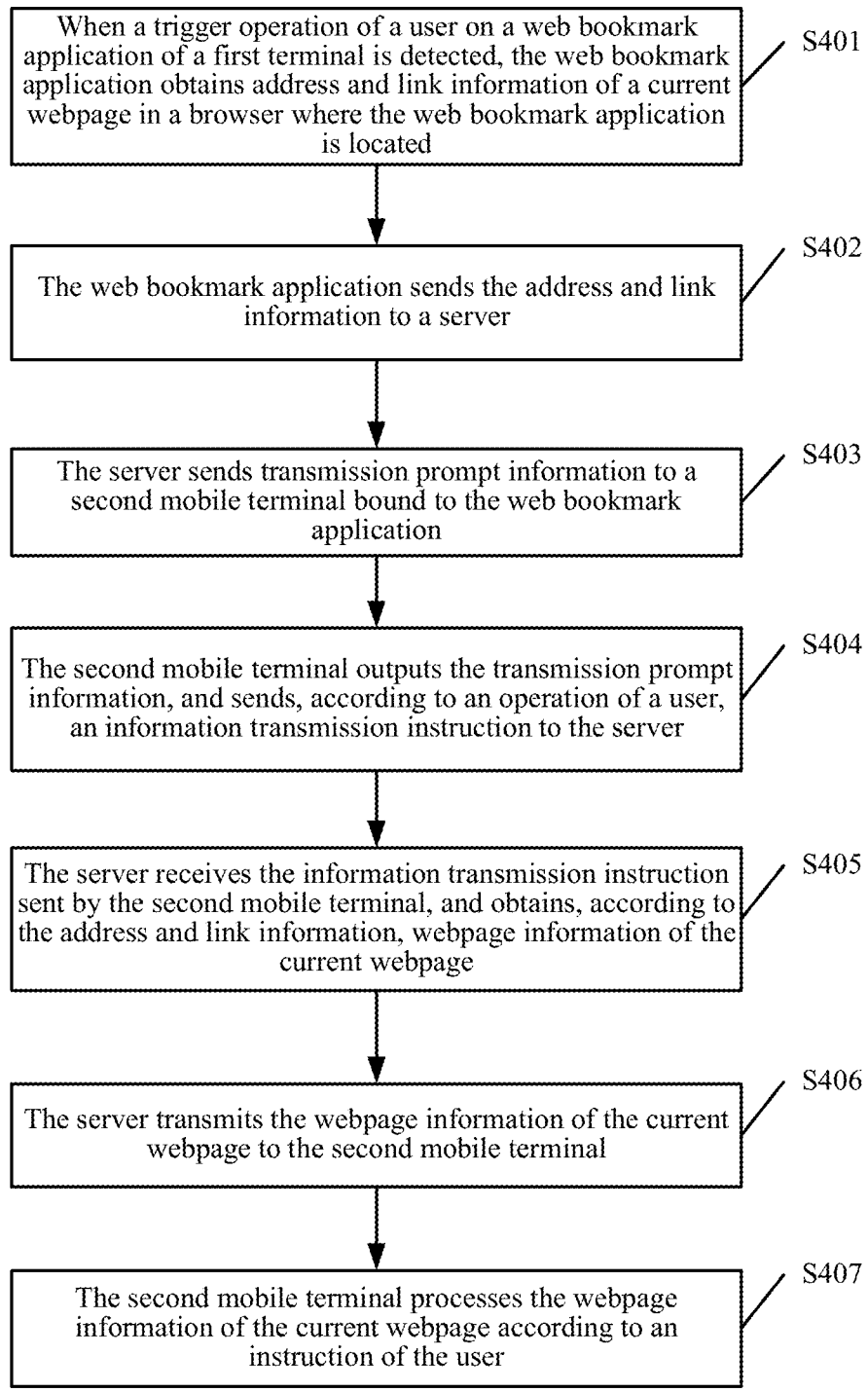
FIG. 4 is a flowchart of still another information processing method provided by an embodiment of the present invention.

Referring to FIG. 4, FIG. 4 is a flowchart of still another information processing method provided by an embodiment of the present invention. This embodiment describes an information processing method performed through interaction between a web bookmark application of a first terminal, a second mobile terminal and a server, and the method may include the following steps S401 to S407.

S401: When a trigger operation of a user on a web bookmark application of a first terminal is detected, the web bookmark application obtains address and link information of a current webpage in a browser where the web bookmark application is located.

S402: The web bookmark application sends the address and link information to a server.

S403: The server sends transmission prompt information to a second mobile terminal bound to the web bookmark application.

S404: The second mobile terminal outputs the transmission prompt information, and sends, according to an operation of the user, an information transmission instruction to the server.

S405: The server receives the information transmission instruction sent by the second mobile terminal, and obtains, according to the link information, webpage information of the current webpage.

S406: The server transmits the webpage information of the current webpage to the second mobile terminal.

S407: The second mobile terminal processes the thumbnail images and the address information according to a user instruction.

To facilitate information transmission, before sending the webpage information, the server may process the webpage information, for example, may perform compression and encapsulation processing on the thumbnail images and the address information of the current webpage, so as to improve an information transmission rate. It should be understood that, after receiving the processed webpage information, the second mobile terminal correspondingly performs decapsulation and decompression processing.

Figure 5:
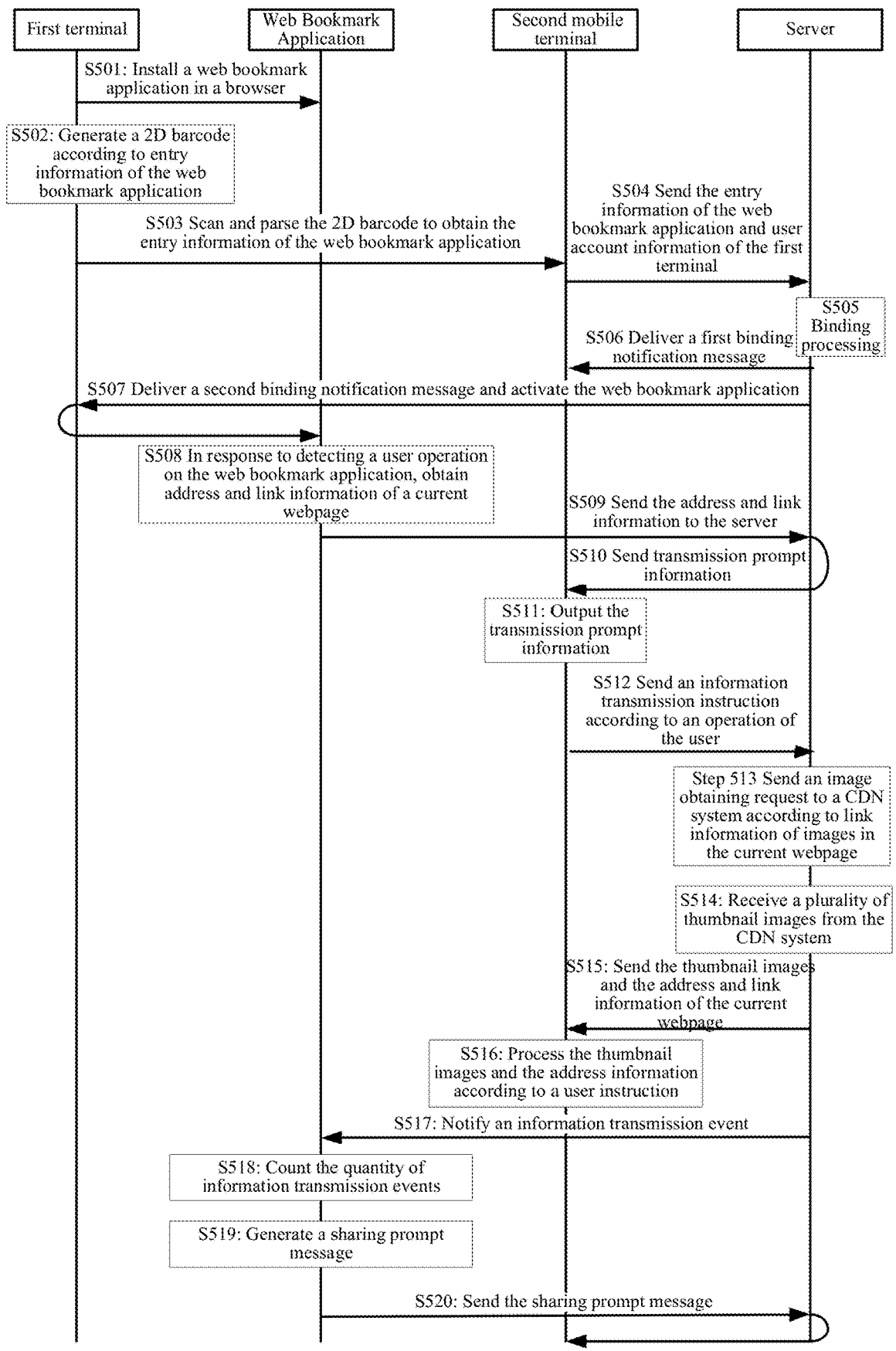
FIG. 5 is a flowchart of still another information processing method provided by an embodiment of the present invention.

Referring to FIG. 5, FIG. 5 is a flowchart of still another information processing method provided by an embodiment of the present invention. This embodiment describes an information processing method performed through interaction between a web bookmark application of a first terminal, a second mobile terminal and a server, and the method may include the following steps S501 to S520.

S501: A first terminal installs the web bookmark application in a browser.

S502: The first terminal generates a 2D barcode according to entry information of the web bookmark application.

S503: A second mobile terminal scans and parses the 2D barcode to obtain the entry information of the web bookmark application.

S504: The second mobile terminal sends the entry information of the web bookmark application and user account information of the first terminal.

S505: The server performs binding processing on the entry information of the web bookmark application and the account information of the second mobile terminal.

S506: The server delivers a first binding notification message to the second mobile terminal, where the first binding notification message includes the entry information of the web bookmark application bound to the second mobile terminal.

S507: The server delivers a second binding notification message to the web bookmark application and activates the web bookmark application, where the second binding notification message includes the account information of the second mobile terminal. In some embodiments, the second mobile terminal may be bounded to multiple bookmark applications simultaneously. The multiple bookmark applications may be running on the same first terminal, e.g., through separate web browsers installed on the first terminal. For example, a user may use different web browsers on the same computer. By establishing a separate binding between each web browser and his/her second mobile terminal (e.g., smartphone or tablet), the smartphone can receive information rendered on different web browsers. Similarly, the multiple bookmark applications may be even running on distinct first terminals through their respective web browsers. In this case, content visualized at different first terminals can be downloaded onto the same second mobile terminal for display to the user of the second mobile terminal. As a result, the relationship between the multiple first terminals and the second mobile terminal is asymmetric. For example, the user of the second mobile terminal can terminate the binding relationship between the second mobile terminal and one or more of the multiple first terminals. A termination of the binding relationship between the second mobile terminal and a particular first terminal does not affect the binding relationship between the second mobile terminal and the other first terminals. Conversely, the user of a specific first terminal can only terminate the binding relationship between the second mobile terminal and this specific first terminal while the other binding relationships still exist.

S508: In response to detecting a predefined user operation on the web bookmark application, the web bookmark application obtains address and link information of a current webpage.

S509: The web bookmark application sends the address and link information to the server.

S510: The server sends transmission prompt information to the second mobile terminal bound to the web bookmark application.

S511: The second mobile terminal outputs the transmission prompt information.

S512: The second mobile terminal sends an information transmission instruction to the server according to an operation of the user.

S513: The server sends an image obtaining request to a CDN system according to link information of images in the current webpage, so as to request to obtain image information of which a minimum side length is larger than a preset value in the current webpage, or request to obtain image information of a preset format in the current webpage.

S514: The server receives a plurality of thumbnail images from the CDN system.

S515: The server sends the thumbnail images and the address information of the current webpage to the second mobile terminal.

S516: The second mobile terminal processes the thumbnail images and the address information according to a user instruction.

S517: The server notifies the web bookmark application of an information transmission event.

S518: The web bookmark application counts the quantity of information transmission events.

S519: The web bookmark application generates a sharing prompt message according to the counted quantity.

S520: The web bookmark application sends the sharing prompt message to the second mobile terminal.

The sharing prompt message is used to prompt the quantity of information transmission events, that is, used to prompt the number of times that the second mobile terminal obtains webpage information of a webpage, for example, the sharing prompt message may be that "You have shared five webpages", and so on.

A specific processing procedure of the information processing method in the embodiment of the present invention is described in detail in the following with reference to FIGS. 6A to 6G.

Figure 6A:
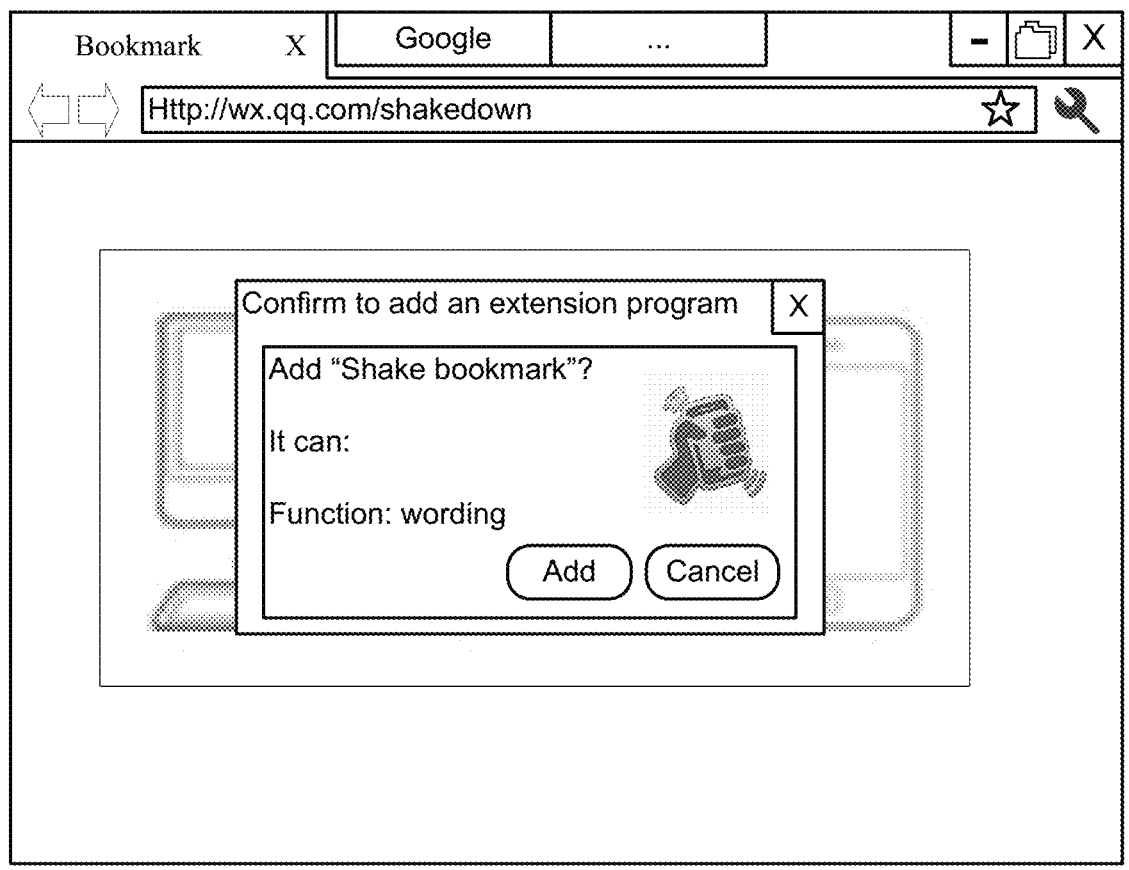
FIG. 6A is a first schematic effect diagram of an information processing method provided by an embodiment of the present invention.

FIG. 6A to FIG. 6G are effect diagrams of an information processing method provided by an embodiment of the present invention. In FIG. 6A, transmitted information is network address information of a current webpage and link information of an image in a browser of a PC, and FIG. 6A shows that a web bookmark application transfers an image (that is, transmits the network address information of the current webpage and the link information of the image) between the PC and a mobile phone through "Shake" of the mobile phone (that is, through an information transmission instruction sent by shaking the mobile phone), and then the mobile phone processes the transmitted information.

It is assumed that a first terminal is a PC, and a second mobile terminal is a mobile phone. A user browses a webpage by using a browser of the PC, and at the same time, uses an instant messaging application in the mobile phone. It is assumed that, the user intends to process a current webpage of the PC in the instant messaging application of the mobile phone, network address information and image information of the current webpage need to be transmitted between the PC and the mobile phone, so as to process the image information of the current webpage in the instant messaging application of the mobile phone. A process of "Shake-web-bookmark-to-transfer-image" shown in FIG. 6A is described in the following.

Figure 6B:
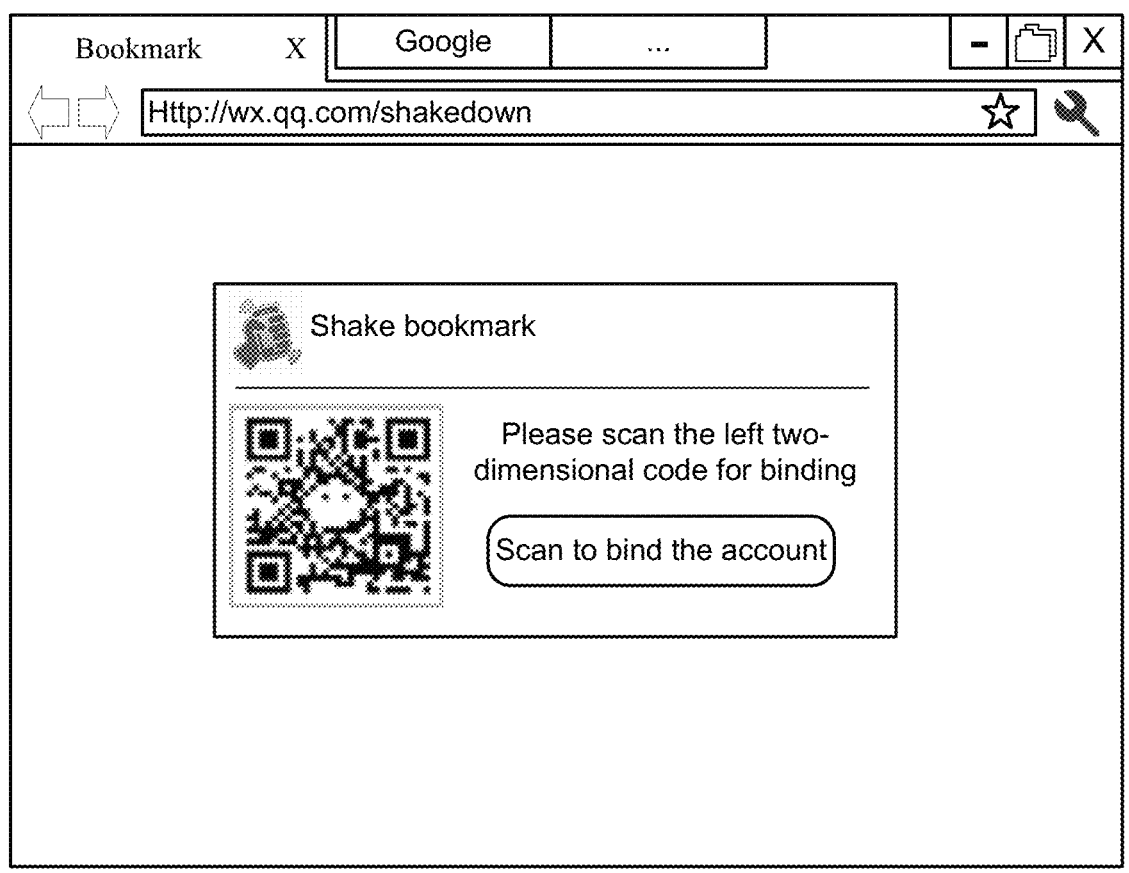
FIG. 6B is a second schematic effect diagram of an information processing method provided by an embodiment of the present invention.
Figure 6C:
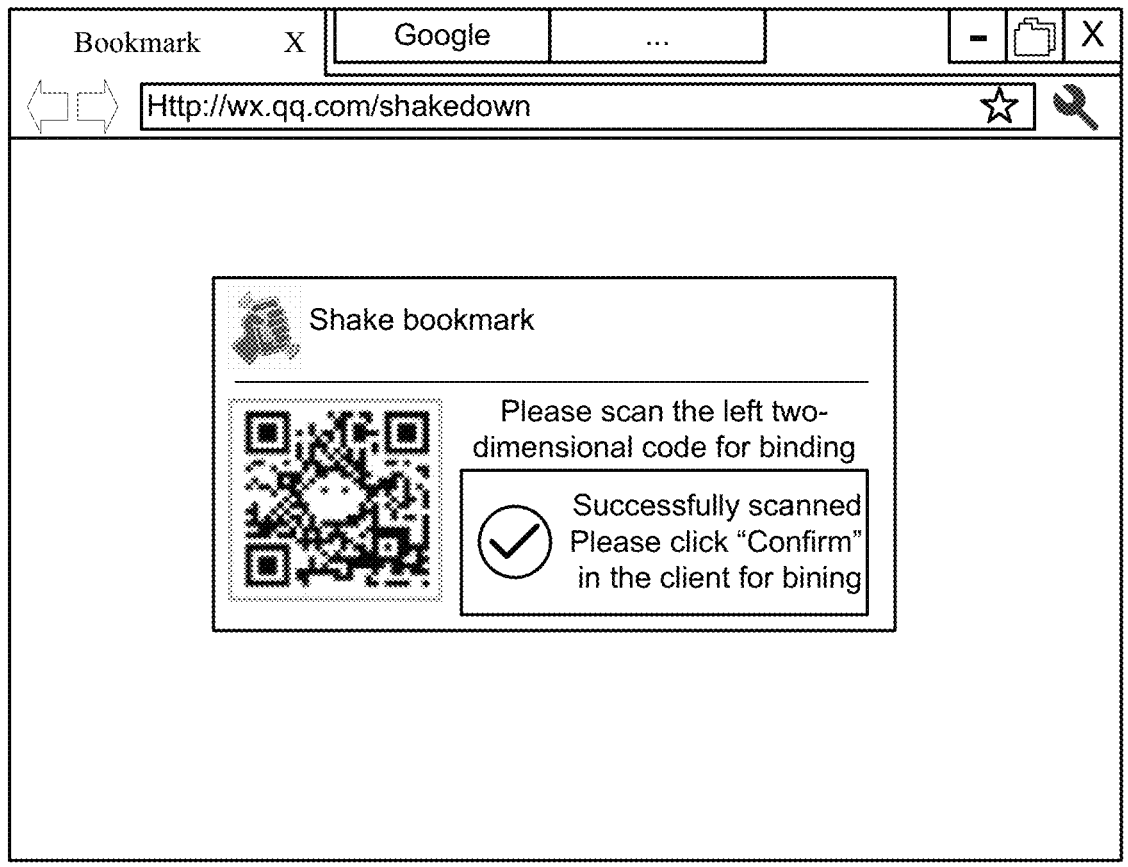
FIG. 6C is a third schematic effect diagram of an information processing method provided by an embodiment of the present invention.
Figure 6D:
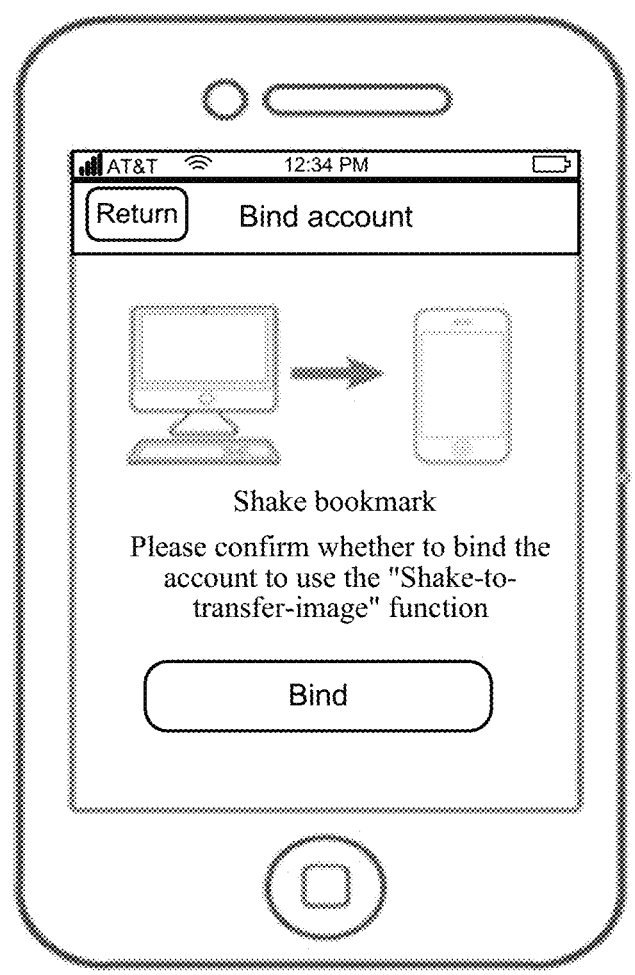
FIG. 6D is a fourth schematic effect diagram of an information processing method provided by an embodiment of the present invention.
Figure 6E:
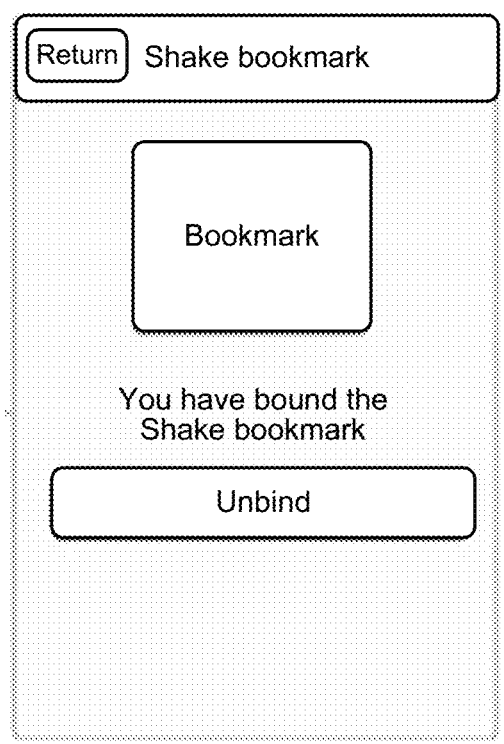
FIG. 6E is a fifth schematic effect diagram of an information processing method provided by an embodiment of the present invention.

As shown in FIG. 6A to FIG. 6B, the PC loads a web bookmark application in the browser, and generates, according to entry information of the web bookmark application, a 2D barcode. The mobile phone scans and parses the 2D barcode to obtain the entry information of the web bookmark application. As shown in FIG. 6C to FIG. 6E, when the user clicks a "Bind" key in the mobile phone, the mobile phone sends the entry information of the web bookmark application and user login account information of the instant messaging application together to a server for binding. The web bookmark application of the PC and the mobile phone respectively receive a binding notification message returned by the server, so as to know information of the two bound parties, and after the web bookmark application and the account information of the instant messaging application in the mobile phone are bound to each other, a prompt is given respectively in the browser of the PC and the mobile phone. The PC triggers, according to a clicking operation of the user on the web bookmark application, the web bookmark application to operate "Shake-web-bookmark", and the web bookmark application extracts the network address information of the current webpage and link address information of the image in the browser and sends the network address information and the link address information of the image to the server. The server receives the network address information of the current webpage and the link address information of the image that are sent by the web bookmark application, and sends transmission prompt information to the mobile phone, so as to prompt the mobile phone to send the information transmission instruction to perform information transmission.

Figure 6F:
FIG. 6F is a sixth schematic effect diagram of an information processing method provided by an embodiment of the present invention.

In the mobile phone end, the mobile phone receives the transmission prompt information sent by the server, and outputs the transmission prompt information to the user, so as to prompt the user to perform an operation to generate the information transmission instruction. As shown in FIG. 6F, the mobile phone detects whether a gravity sensing event generated by shaking the mobile phone exists in an interface of the instant messaging application in real time, and if yes, sends the information transmission instruction to the server. After receiving the information transmission instruction sent by the mobile phone, the server sends an image obtaining request to a CDN system according to the link address information of the image of the current webpage; and the CDN system extracts an image corresponding to the link address information, processes the image into a thumbnail view, and returns the thumbnail view to the server. The server returns the thumbnail view returned by the CDN system and the network address information of the current webpage together to the mobile phone, and at the same time, notifies the web bookmark application in the browser of the PC end of the information transmission event. The web bookmark application counts the quantity of information transmission events, generates, according to the counted quantity, a sharing prompt message, and sends the sharing prompt message to the mobile phone.

Figure 6G:
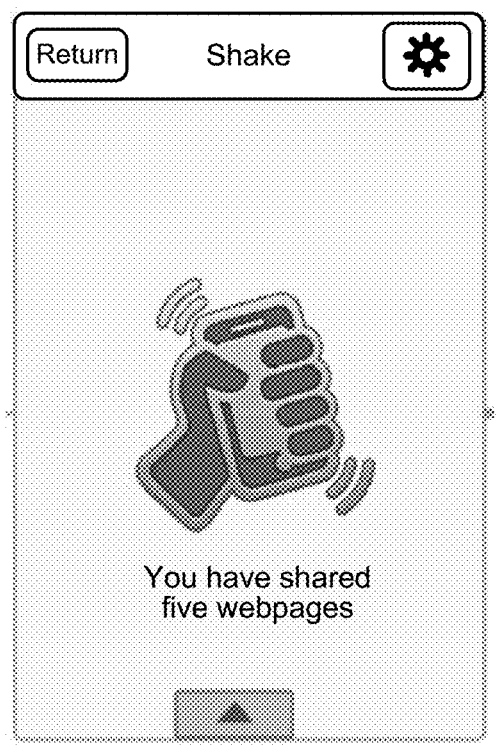
FIG. 6G is a seventh schematic effect diagram of an information processing method provided by an embodiment of the present invention.

In the mobile phone end, the mobile phone receives the network address information of the current webpage and the thumbnail view that are transferred by the server, and may display the received webpage or image information in the webpage in the instant messaging application, and may share it with other terminal users, or share it with applications such as a MicroBlog application, a short message application, and social networking services (SNS) in the mobile phone. As shown in FIG. 6G, when receiving the sharing prompt message sent by the web bookmark application of the browser of the PC end, the mobile phone may output the sharing prompt message, so as to prompt the quantity of information transmission events to the user, that is, to prompt the number of times that the second mobile terminal obtains webpage information of a webpage, for example, the sharing prompt message may be that "You have shared five webpages", and so on.

Through the descriptions of the foregoing method embodiments, in the embodiments of the present invention, under the trigger operation of the user, the web bookmark application may extract the link information of the current webpage in the browser where the web bookmark application is located and send the link information to the server; and the server sends the transmission prompt information to the terminal bound to the web bookmark application, and when receiving the information transmission instruction of the terminal, transmits the webpage information of the current webpage to the terminal for processing, so as to enable the webpage information of the webpage to be transmitted in the web bookmark application and the terminal that are bound to each other, thereby implementing transmission and sharing of the webpage information, facilitating processing of the terminal bound to the web bookmark application on the shared information, and improving the convenience of information processing.

An embodiment of the present invention provides a computer storage medium for storing a program. When the program is run, all or part of the steps of the method according to any one of the embodiments shown in FIG. 1 to FIG. 6A are performed.

An information processing apparatus provided by the embodiments of the present invention is described in detail in the following with reference to FIG. 7 to FIG. 8. It should be noted that, the following apparatus may be a web bookmark application loaded in a browser, and the apparatus may be applied in the foregoing method.

Figure 7:
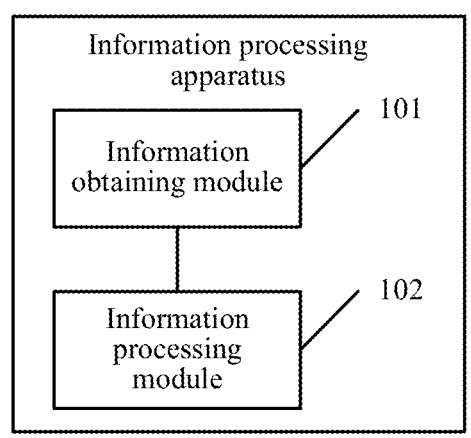
FIG. 7 is a schematic structural diagram of an information processing apparatus provided by an embodiment of the present invention.

Referring to FIG. 7, FIG. 7 is a schematic structural diagram of an information processing apparatus provided by an embodiment of the present invention, and the apparatus may include: an information obtaining module 101 and an information processing module 102.

The information obtaining module 101 is configured to: when a trigger operation of a user on a web bookmark application of a first terminal is detected, obtain link information of a current webpage in a browser where the web bookmark application is located.

The trigger operation of the user on the web bookmark application of the first terminal may be: an operation of the user clicking the web bookmark application, or an operation of the user selecting the web bookmark application. The link information of the current webpage includes: network address information of the current webpage and link information of images in the current webpage.

The information processing module 102 is configured to send the link information to a server, so that the server sends, according to the address and link information, transmission prompt information to a second mobile terminal bound to the web bookmark application, and when receiving an information transmission instruction of the second mobile terminal, transmits webpage information of the current webpage to the second mobile terminal for processing.

Figure 8:
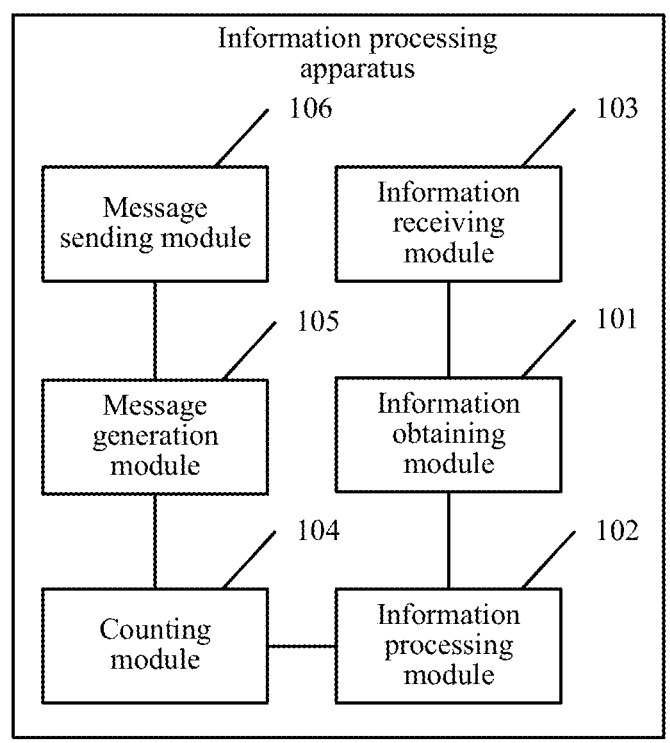
FIG. 8 is a schematic structural diagram of another information processing apparatus provided by an embodiment of the present invention.

Referring to FIG. 8, FIG. 8 is a schematic structural diagram of another information processing apparatus provided by an embodiment of the present invention. The apparatus may include: an information obtaining module 101, an information processing module 102, an information receiving module 103, a counting module 104, a message generation module 105, and a message sending module 106. For structures of the information obtaining module 101 and the information processing module 102, reference may be made to relevant illustrations in the embodiment shown in FIG. 7, which are not elaborated herein.

The information module 103 is configured to receive a second binding notification message delivered by the server, where the second binding notification message includes account information of the first terminal.

The counting module 104 is configured to count the quantity of information transmission events notified by the server.

The message generation module 105 is configured to generate a sharing prompt message according to the counted quantity of information transmission events.

The message sending module 106 is configured to send the sharing prompt message to the second mobile terminal.

The sharing prompt message is used to prompt the quantity of information transmission events, that is, used to prompt the number of times that the second mobile terminal obtains webpage information of a webpage, for example, the sharing prompt message may be that "You have shared five webpages", and so on.

It should be noted that, the function of each function module of the information processing apparatus in the embodiments of the present invention may be specifically implemented according to the method in the foregoing method embodiments, and for a specific implementation process, reference may be made to relevant descriptions in the foregoing method embodiments, which is not elaborated herein.

Through the descriptions of the foregoing information processing apparatus embodiments, in the embodiments of the present invention, under the trigger operation of the user, the web bookmark application may extract the link information of the current webpage in the browser where the web bookmark application is located and send the link information to the server; and the server sends the transmission prompt information to the terminal bound to the web bookmark application, and when receiving the information transmission instruction of the terminal, transmits the webpage information of the current webpage to the terminal for processing, so as to enable the webpage information of the webpage to be transmitted in the web bookmark application and the terminal that are bound to each other, thereby implementing transmission and sharing of the webpage information, facilitating processing of the terminal bound to the web bookmark application on the shared information, and improving the convenience of information processing.

A terminal provided by the embodiments of the present invention is described in detail in the following with reference to FIG. 9 to FIG. 10. It should be noted that, the following terminal includes the information processing apparatus shown in any one of the embodiments in FIG. 7 to FIG. 8, and the following terminal may be applied in the foregoing method.

Figure 9:
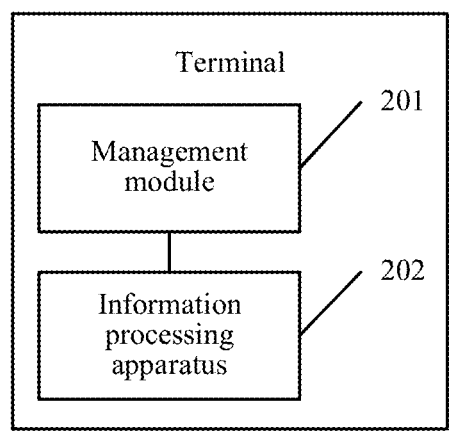
FIG. 9 is a schematic structural diagram of a terminal provided by an embodiment of the present invention.

Referring to FIG. 9, FIG. 9 is a schematic structural diagram of a terminal provided by an embodiment of the present invention. The terminal in this embodiment may be the first terminal according to any one of the embodiments shown in FIG. 1 to FIG. 6A, and the terminal may include: a management module 201 and an information processing apparatus 202. For a structure of the information processing apparatus 202, reference may be made to relevant illustrations in the embodiment shown in FIG. 7 or FIG. 8, which is not elaborated herein.

The management module 201 is configured to load the information transmission apparatus in the browser, and manage the information transmission apparatus.

Figure 10:
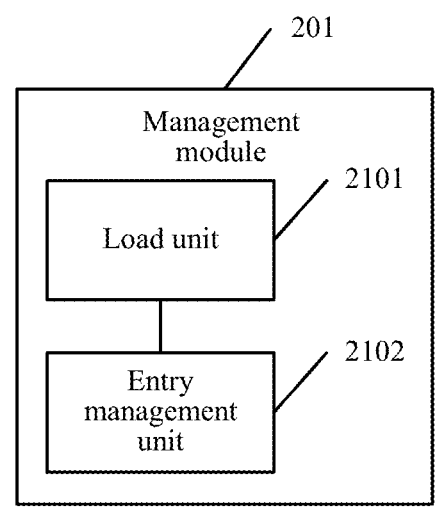
FIG. 10 is a schematic structural diagram of an embodiment of a management module shown in FIG. 9.

Referring to FIG. 10, FIG. 10 is a schematic structural diagram of an embodiment of the management module shown in FIG. 9, and the management module 201 may include: a load unit 2101 and an entry management unit 2102.

The load unit 2101 is configured to load the information transmission apparatus in the browser.

The entry management unit 2102 is configured to generate a 2D barcode according to entry information of the information transmission apparatus.

It should be noted that, the function of each function module of the terminal in the embodiments of the present invention may be specifically implemented according to the method in the foregoing method embodiments, and for a specific implementation process, reference may be made to relevant descriptions in the foregoing method embodiments, which is not elaborated herein.

Through the descriptions of the foregoing terminal embodiments, in the embodiments of the present invention, under the trigger operation of the user, the web bookmark application may extract the link information of the current webpage in the browser where the web bookmark application is located and send the link information to the server; and the server sends the transmission prompt information to the terminal bound to the web bookmark application, and when receiving the information transmission instruction of the terminal, transmits the webpage information of the current webpage to the terminal for processing, so as to enable the webpage information of the webpage to be transmitted in the web bookmark application and the terminal that are bound to each other, thereby implementing transmission and sharing of the webpage information, facilitating processing of the terminal bound to the web bookmark application on the shared information, and improving the convenience of information processing.

Another terminal provided by the embodiments of the present invention is described in detail in the following with reference to FIG. 11 to FIG. 13. It should be noted that, the following terminal may be applied in the foregoing method.

Figure 11:
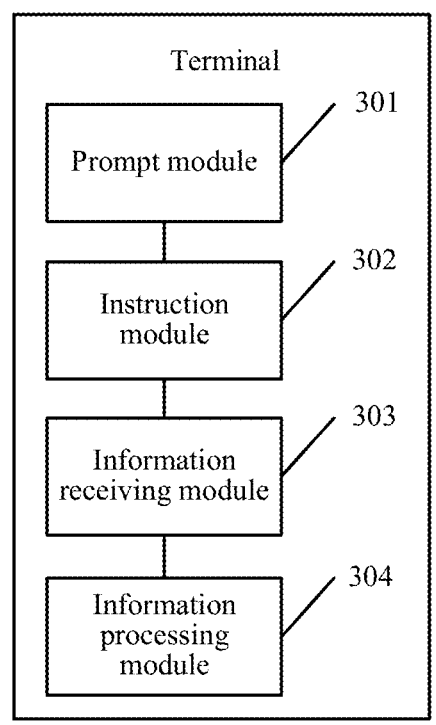
FIG. 11 is a schematic structural diagram of another terminal provided by an embodiment of the present invention.

Referring to FIG. 11, FIG. 11 is a schematic structural diagram of another terminal provided by an embodiment of the present invention. The terminal in this embodiment may be the second mobile terminal according to any one of the embodiments shown in FIG. 1 to FIG. 6A, and the terminal may include: a prompt module 301, an instruction module 302, an information receiving module 303, and an information processing module 304.

The prompt module 301 is configured to receive and output transmission prompt information sent by a server.

The instruction module 302 is configured to send an information transmission instruction to the server according to an operation of a user.

The information receiving module 303 is configured to receive webpage information, which is returned by the server, of a current webpage in a browser where the web bookmark application bound to the terminal is located.

The information processing module 304 is configured to process the webpage information of the current webpage according to an instruction of the user.

A process of the information processing module 304 processing the webpage information of the current webpage may include: displaying the information in a built-in browser of an application of the second mobile terminal, sharing the information with other terminal users, or sharing the information with other applications in the second mobile terminal.

Figure 12:
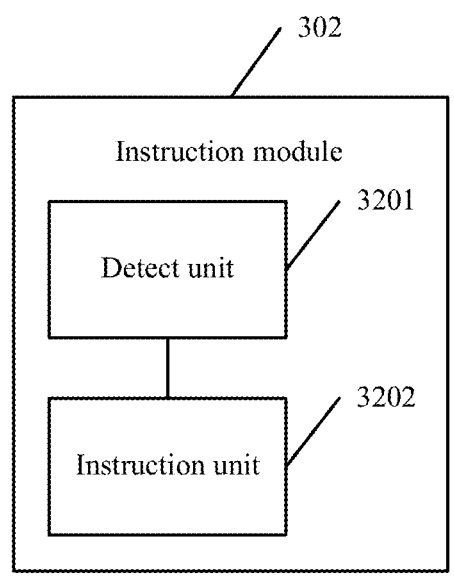
FIG. 12 is a schematic structural diagram of an embodiment of an instruction module shown in FIG. 11.

Referring to FIG. 12, FIG. 12 is a schematic structural diagram of an embodiment of the instruction module shown in FIG. 11, and the instruction module 302 may include: a detect unit 3201 and an instruction unit 3202.

The detect unit 3201 is configured to detect a gravity sensing event generated by an operation of a user, or configured to detect a voice control command input by a user, or configured to detect a specific key event generated by an operation of a user.

The instruction unit 3202 is configured to send an information transmission instruction to the server according to the detected gravity sensing event, or configured to send an information transmission instruction to the server according to the detected voice control command, or configured to send an information transmission instruction to the server according to the detected specific key event.

Figure 13:
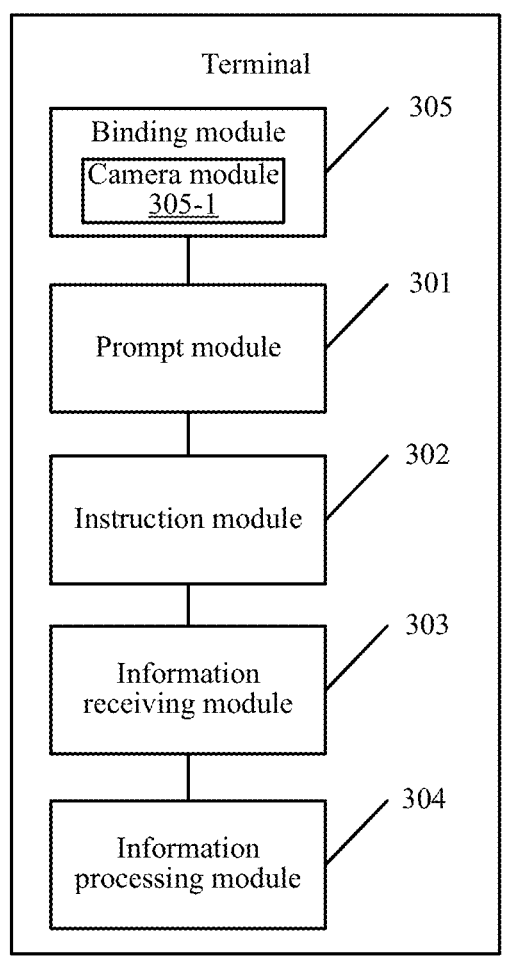
FIG. 13 is a schematic structural diagram of still another terminal provided by an embodiment of the present invention.

Referring to FIG. 13, FIG. 13 is a schematic structural diagram of still another terminal provided by an embodiment of the present invention. The terminal in this embodiment may be the second mobile terminal according to any one of the embodiments shown in FIG. 1 to FIG. 6A, and the terminal may include: a prompt module 301, an instruction module 302, an information receiving module 303, an information processing module 304, and a binding module 305. For structures of the prompt module 301, the instruction module 302, the information receiving module 303, and the information processing module 304, reference may be made to relevant illustrations in the embodiments shown in FIG. 11 and FIG. 12, which are not elaborated herein.

The binding module 305 is configured to scan and parse a 2D barcode corresponding to the web bookmark application, e.g., using a camera module 305-1, to obtain entry information of the web bookmark application, send the entry information of the web bookmark application and account information of the terminal to the server for binding, and receive a first binding notification message delivered by the server.

The first binding notification message includes the entry information of the web bookmark application bound to the terminal, where the entry information includes address information and identification information of the web bookmark application.

It should be noted that, the function of each function module of the terminal in the embodiments of the present invention may be specifically implemented according to the method in the foregoing method embodiments, and for a specific implementation process, reference may be made to relevant descriptions in the foregoing method embodiments, which is not elaborated herein.

Through the descriptions of the foregoing terminal embodiments, in the embodiments of the present invention, under the trigger operation of the user, the web bookmark application may extract the link information of the current webpage in the browser where the web bookmark application is located and send the link information to the server; and the server sends the transmission prompt information to the terminal bound to the web bookmark application, and when receiving the information transmission instruction of the terminal, transmits the webpage information of the current webpage to the terminal for processing, so as to enable the webpage information of the webpage to be transmitted in the web bookmark application and the terminal that are bound to each other, thereby implementing transmission and sharing of the webpage information, facilitating processing of the terminal bound to the web bookmark application on the shared information, and improving the convenience of information processing.

A server provided by the embodiments of the present invention is described in detail in the following with reference to FIG. 14 to FIG. 16. It should be noted that, the following server may be applied in the foregoing method.

Figure 14:
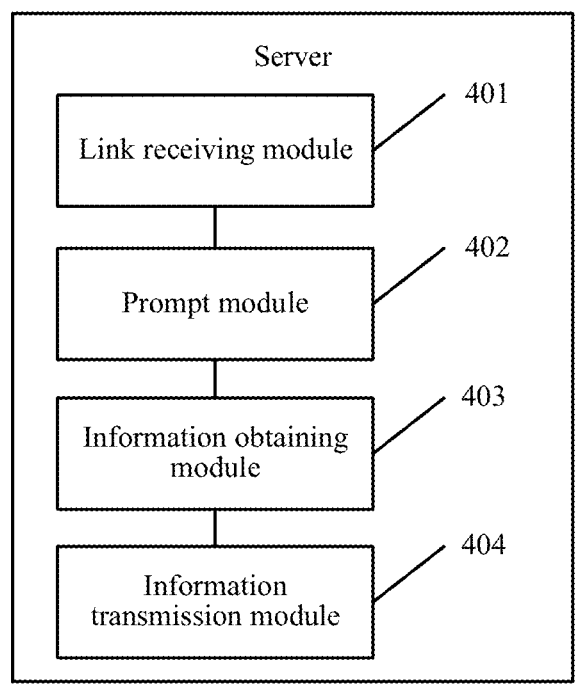
FIG. 14 is a schematic structural diagram of a server provided by an embodiment of the present invention.

Referring to FIG. 14, FIG. 14 is a schematic structural diagram of a server provided by an embodiment of the present invention, and the server may include: a link receiving module 401, a prompt module 402, an information obtaining module 403, and an information transmission module 404.

The link receiving module 401 is configured to receive link information, which is sent by a web bookmark application of a first terminal, of a current webpage in a browser where the web bookmark application is located.

The prompt module 402 is configured to send transmission prompt information to a second mobile terminal bound to the web bookmark application.

The information obtaining module 403 is configured to: when receiving an information transmission instruction sent by the second mobile terminal, obtain webpage information of the current webpage according to the address and link information.

The information transmission module 404 is configured to send the webpage information of the current webpage to the second mobile terminal.

Figure 15:
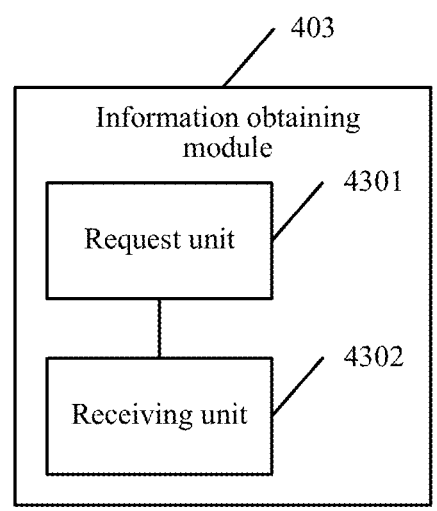
FIG. 15 is a schematic structural diagram of an embodiment of an information obtaining module shown in FIG. 14.

Referring to FIG. 15, FIG. 15 is a schematic structural diagram of an embodiment of the information obtaining module shown in FIG. 14, and the information obtaining module 403 may include: a request unit 4301 and a receiving unit 4302.

The request unit is configured to send an image obtaining request to a CDN system according to link information of images in a current webpage, so as to request to obtain image information of which a minimum side length is larger than a preset value in the current webpage, or request to obtain image information of a preset format in the current webpage.

The receiving unit is configured to receive a plurality of thumbnail images from the CDN system.

The link information includes: network address information of the current webpage and the link address information of the image in the current webpage.

In this embodiment, the information transmission module 404 is specifically configured to transmit the thumbnail view returned by the CDN system and the network address information of the current webpage to the second mobile terminal.

Figure 16:
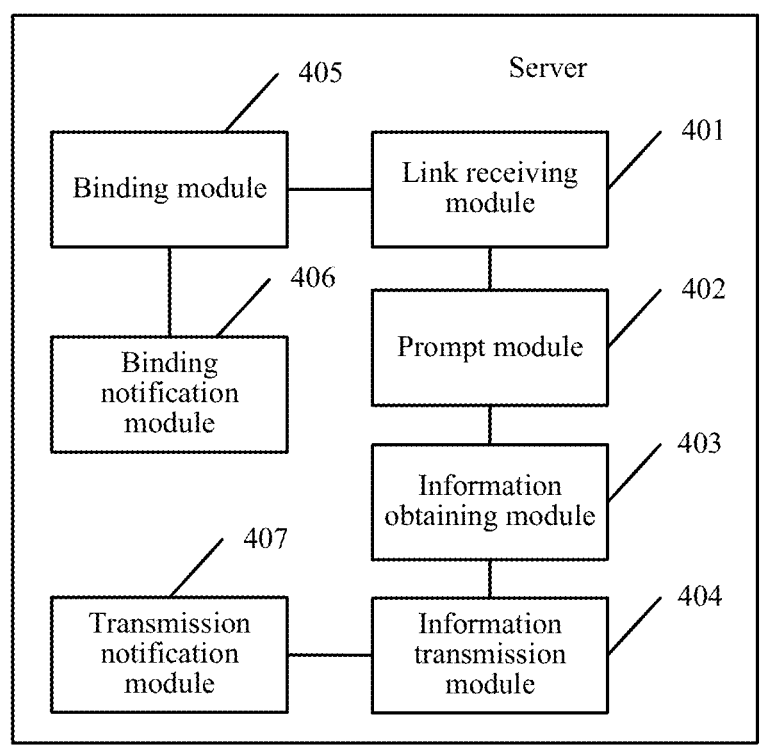
FIG. 16 is a schematic structural diagram of another server provided by an embodiment of the present invention.

Referring to FIG. 16, FIG. 16 is a schematic structural diagram of another server provided by an embodiment of the present invention, and the server may include: a link receiving module 401, a prompt module 402, an information obtaining module 403, an information transmission module 404, a binding module 405, a binding notification module 406, and a transmission notification module 407. For structures of the link receiving module 401, the prompt module 402, the information obtaining module 403, and the information transmission module 404, reference may be made to relevant descriptions in the embodiments shown in FIG. 14 and FIG. 15, which are not elaborated herein.

The binding module 405 is configured to bind the web bookmark application and the second mobile terminal according to entry information of the web bookmark application and account information of the second mobile terminal that are sent by the second mobile terminal.

The binding notification module 406 is configured to deliver a first binding notification message to the second mobile terminal, and deliver a second binding notification message to the web bookmark application.

The transmission notification module 407 is configured to notify the web bookmark application of an information transmission event.

The first binding notification message includes the entry information of the web bookmark application bound to the second mobile terminal, and the second binding notification message includes the account information of the second mobile terminal bound to the web bookmark application.

It should be noted that, the function of each function module of the server in the embodiments of the present invention may be specifically implemented according to the method in the foregoing method embodiments, and for a specific implementation process, reference may be made to relevant descriptions in the foregoing method embodiments, which is not elaborated herein.

Through the descriptions of the foregoing server embodiments, in the embodiments of the present invention, under the trigger operation of the user, the web bookmark application may extract the link information of the current webpage in the browser where the web bookmark application is located and send the link information to the server; and the server sends the transmission prompt information to the terminal bound to the web bookmark application, and when receiving the information transmission instruction of the terminal, transmits the webpage information of the current webpage to the terminal for processing, so as to enable the webpage information of the webpage to be transmitted in the web bookmark application and the terminal that are bound to each other, thereby implementing transmission and sharing of the webpage information, facilitating processing of the terminal bound to the web bookmark application on the shared information, and improving the convenience of information processing.

Persons of ordinary skill in the art may understand that all or a part of the processes of the foregoing method embodiments may be completed by a computer program instructing relevant hardware. The program may be stored in a computer readable storage medium. When the program is run, the processes of the foregoing method embodiments are performed. The storage medium may be a magnetic disk, an optical disk, a read-only memory (ROM), a random access memory (RAM), and the like.

The foregoing disclosures are only exemplary embodiments of the present invention, and certainly are not intended to limit the scope of rights of the present invention; therefore, any equivalent change made according to the claims of the present invention still falls within the scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An information processing method performed at a server having a processor and memory for storing one or more programs to be executed by the processor, the method comprising:

establishing, by the server, an exclusive binding relationship between a webpage extraction application running on a first terminal and a user account of an instant messaging application running on a second mobile terminal;

receiving, by the server, an identifier of a webpage currently displayed on the first terminal from the webpage extraction application running on the first terminal, wherein the webpage extraction application initiates a transmission of the webpage to the server in response to a predefined user operation, the transmission including the identifier of the webpage and address information of a plurality of images in the webpage that satisfy a predefined size threshold;

sending, by the server, an information transmission prompt message corresponding to the identifier of the webpage to the second mobile terminal, wherein the information transmission prompt message is to be displayed on the second mobile terminal indicating that there are one or more images that satisfy the predefined size threshold to be shared with the second mobile terminal by the first terminal;

receiving, by the server, an information transmission instruction message from the second mobile terminal, wherein the information transmission instruction message is generated by the second mobile terminal in response to a predefined user operation on the information transmission prompt message displayed on the second mobile terminal;

sending, by the server, the identifier of the webpage and the address information of the images in the webpage that satisfy the predefined size threshold to the second mobile terminal, wherein the second mobile terminal displays the webpage and the images according to the identifier of the webpage and the address information of the images in the webpage, respectively; and sending, by the server, an information transmission notification message to the first terminal after sending the identifier of the webpage and the address information of the images in the webpage that satisfy the predefined size threshold to the second mobile terminal.

2. The method according to claim 1, wherein the establishing, by the server, the exclusive binding relationship further comprises:

receiving, by the server, an identity request from the webpage extraction application running on the first terminal;

returning, by the server and the first terminal, a response to the webpage extraction application, the response including entry information associated with the webpage extraction application and the entry information including address information and identification information of the webpage extraction application;

receiving, by the server and from the second mobile terminal, the entry information captured by the second mobile terminal and the user account of the instant messaging application running on the second mobile terminal;

sending, by the server, a first binding notification message to the second mobile terminal, wherein the first binding notification message includes the identification information of the webpage extraction application; and sending, by the server, a second binding notification message to the first terminal, wherein the second binding notification message includes the user account of the instant messaging application running on the second mobile terminal.

3. The method according to claim 2, wherein the first terminal is configured to display a digital representation of the entry information so that the second mobile terminal can obtain the entry information by scanning the digital representation.

4. The method according to claim 3, wherein the digital representation is one selected from the group consisting of 1D barcode, 2D barcode, and 3D barcode.

5. The method according to claim 1, wherein the predefined user operation on the information transmission prompt message is one selected from the group consisting of:

a gravity sensing event caused by a predefined user movement of the second mobile terminal, and sending an information transmission instruction to the application according to the detected gravity sensing event; or a voice control command caused by the user of the second mobile terminal, and sending an information transmission instruction to the application according to the detected voice control command; or a predefined key pressing event caused by the user of the second mobile terminal, and sending an information transmission instruction to the application according to the detected predefined key pressing event.

6. The method according to claim 1, further comprising:

receiving an image access request from the second mobile terminal, the image access request including an identifier of one of a plurality of thumbnail images associated with the document and selected by a user at the second mobile terminal;

retrieving an image corresponding to the user-selected thumbnail image in its original size from a content delivery network (CDN) system; and returning the image to the second mobile terminal.

7. A server comprising:

one or more processors;

memory; and a plurality of programs stored in the memory, wherein the plurality of programs, when executed by the one or more processors, cause the server to perform operations including:

establishing, by the server, an exclusive binding relationship between a webpage extraction application running on a first terminal and a user account of an instant messaging application running on a second mobile terminal;

receiving, by the server, an identifier of a webpage currently displayed on the first terminal from the webpage extraction application running on the first terminal, wherein the webpage extraction application initiates a transmission of the webpage to the server in response to a predefined user operation, the transmission including the identifier of the webpage and address information of a plurality of images in the webpage that satisfy a predefined size threshold;

sending, by the server, an information transmission prompt message corresponding to the identifier of the webpage to the second mobile terminal, wherein the information transmission prompt message is to be displayed on the second mobile terminal indicating that there are one or more images that satisfy the predefined size threshold to be shared with the second mobile terminal by the first terminal;

receiving, by the server, an information transmission instruction message from the second mobile terminal, wherein the information transmission instruction message is generated by the second mobile terminal in response to a predefined user operation on the information transmission prompt message displayed on the second mobile terminal;

sending, by the server, the identifier of the webpage and the address information of the images in the webpage that satisfy the predefined size threshold to the second mobile terminal, wherein the second mobile terminal displays the webpage and the images according to the identifier of the webpage and the address information of the images in the webpage, respectively; and sending, by the server, an information transmission notification message to the first terminal after sending the identifier of the webpage and the address information of the images in the webpage that satisfy the predefined size threshold to the second mobile terminal.

8. The server according to claim 7, wherein the operation of establishing, by the server, the exclusive binding relationship further comprises:

receiving, by the server, an identity request from the webpage extraction application running on the first terminal;

returning, by the server and the first terminal, a response to the webpage extraction application, the response including entry information associated with the webpage extraction application and the entry information including address information and identification information of the webpage extraction application;

receiving, by the server and from the second mobile terminal, the entry information captured by the second mobile terminal and the user account of the instant messaging application running on the second mobile terminal;

sending, by the server, a first binding notification message to the second mobile terminal, wherein the first binding notification message includes the identification information of the webpage extraction application; and sending, by the server, a second binding notification message to the first terminal, wherein the second binding notification message includes the user account of the instant messaging application running on the second mobile terminal.

9. The server according to claim 8, wherein the first terminal is configured to display a digital representation of the entry information so that the second mobile terminal can obtain the entry information by scanning the digital representation.

10. The server according to claim 9, wherein the digital representation is one selected from the group consisting of 1D barcode, 2D barcode, and 3D barcode.

11. The server according to claim 7, wherein the predefined user operation on the information transmission prompt message is one selected from the group consisting of:

a gravity sensing event caused by a predefined user movement of the second mobile terminal, and sending an information transmission instruction to the application according to the detected gravity sensing event; or a voice control command caused by the user of the second mobile terminal, and sending an information transmission instruction to the application according to the detected voice control command; or a predefined key pressing event caused by the user of the second mobile terminal, and sending an information transmission instruction to the application according to the detected predefined key pressing event.

12. The server according to claim 7, wherein the plurality of operations further comprise:

receiving an image access request from the second mobile terminal, the image access request including an identifier of one of a plurality of thumbnail images associated with the document and selected by a user at the second mobile terminal;

retrieving an image corresponding to the user-selected thumbnail image in its original size from a content delivery network (CDN) system; and returning the image to the second mobile terminal.

13. A non-transitory computer-readable storage medium, storing one or more programs configured for execution by one or more processors of a server, the one or more programs including instructions for:

establishing, by the server, an exclusive binding relationship between a webpage extraction application running on a first terminal and a user account of an instant messaging application running on a second mobile terminal;

receiving, by the server, an identifier of a webpage currently displayed on the first terminal from the webpage extraction application running on the first terminal, wherein the webpage extraction application initiates a transmission of the webpage to the server in response to a predefined user operation, the transmission including the identifier of the webpage and address information of a plurality of images in the webpage that satisfy a predefined size threshold;

sending, by the server, an information transmission prompt message corresponding to the identifier of the webpage to the second mobile terminal, wherein the information transmission prompt message is to be displayed on the second mobile terminal indicating that there are one or more images that satisfy the predefined size threshold to be shared with the second mobile terminal by the first terminal;

receiving, by the server, an information transmission instruction message from the second mobile terminal, wherein the information transmission instruction message is generated by the second mobile terminal in response to a predefined user operation on the information transmission prompt message displayed on the second mobile terminal;

sending, by the server, the identifier of the webpage and the address information of the images in the webpage that satisfy the predefined size threshold to the second mobile terminal, wherein the second mobile terminal displays the webpage and the images according to the identifier of the webpage and the address information of the images in the webpage, respectively; and sending, by the server, an information transmission notification message to the first terminal after sending the identifier of the webpage and the address information of the images in the webpage that satisfy the predefined size threshold to the second mobile terminal.

14. The non-transitory computer-readable storage medium according to claim 13, wherein the operation of establishing, by the server, the exclusive binding relationship further comprises:

receiving, by the server, an identity request from the webpage extraction application running on the first terminal;

returning, by the server and the first terminal, a response to the webpage extraction application, the response including entry information associated with the webpage extraction application and the entry information including address information and identification information of the webpage extraction application;

receiving, by the server and from the second mobile terminal, the entry information captured by the second mobile terminal and the user account of the instant messaging application running on the second mobile terminal;

sending, by the server, a first binding notification message to the second mobile terminal, wherein the first binding notification message includes the identification information of the webpage extraction application; and sending, by the server, a second binding notification message to the first terminal, wherein the second binding notification message includes the user account of the instant messaging application running on the second mobile terminal.

15. The non-transitory computer-readable storage medium according to claim 14, wherein the first terminal is configured to display a digital representation of the entry information so that the second mobile terminal can obtain the entry information by scanning the digital representation.

16. The non-transitory computer-readable storage medium according to claim 15, wherein the digital representation is one selected from the group consisting of 1D barcode, 2D barcode, and 3D barcode.

17. The non-transitory computer-readable storage medium according to claim 13, wherein the predefined user operation on the information transmission prompt message is one selected from the group consisting of:

a gravity sensing event caused by a predefined user movement of the second mobile terminal, and sending an information transmission instruction to the application according to the detected gravity sensing event; or a voice control command caused by the user of the second mobile terminal, and sending an information transmission instruction to the application according to the detected voice control command; or a predefined key pressing event caused by the user of the second mobile terminal, and sending an information transmission instruction to the application according to the detected predefined key pressing event.

18. The non-transitory computer-readable storage medium according to claim 13, wherein the plurality of operations further comprise:

receiving an image access request from the second mobile terminal, the image access request including an identifier of one of a plurality of thumbnail images associated with the document and selected by a user at the second mobile terminal;

retrieving an image corresponding to the user-selected thumbnail image in its original size from a content delivery network (CDN) system; and returning the image to the second mobile terminal.

* * * * *